United States Patent Office 3,092,116
Patented June 4, 1963

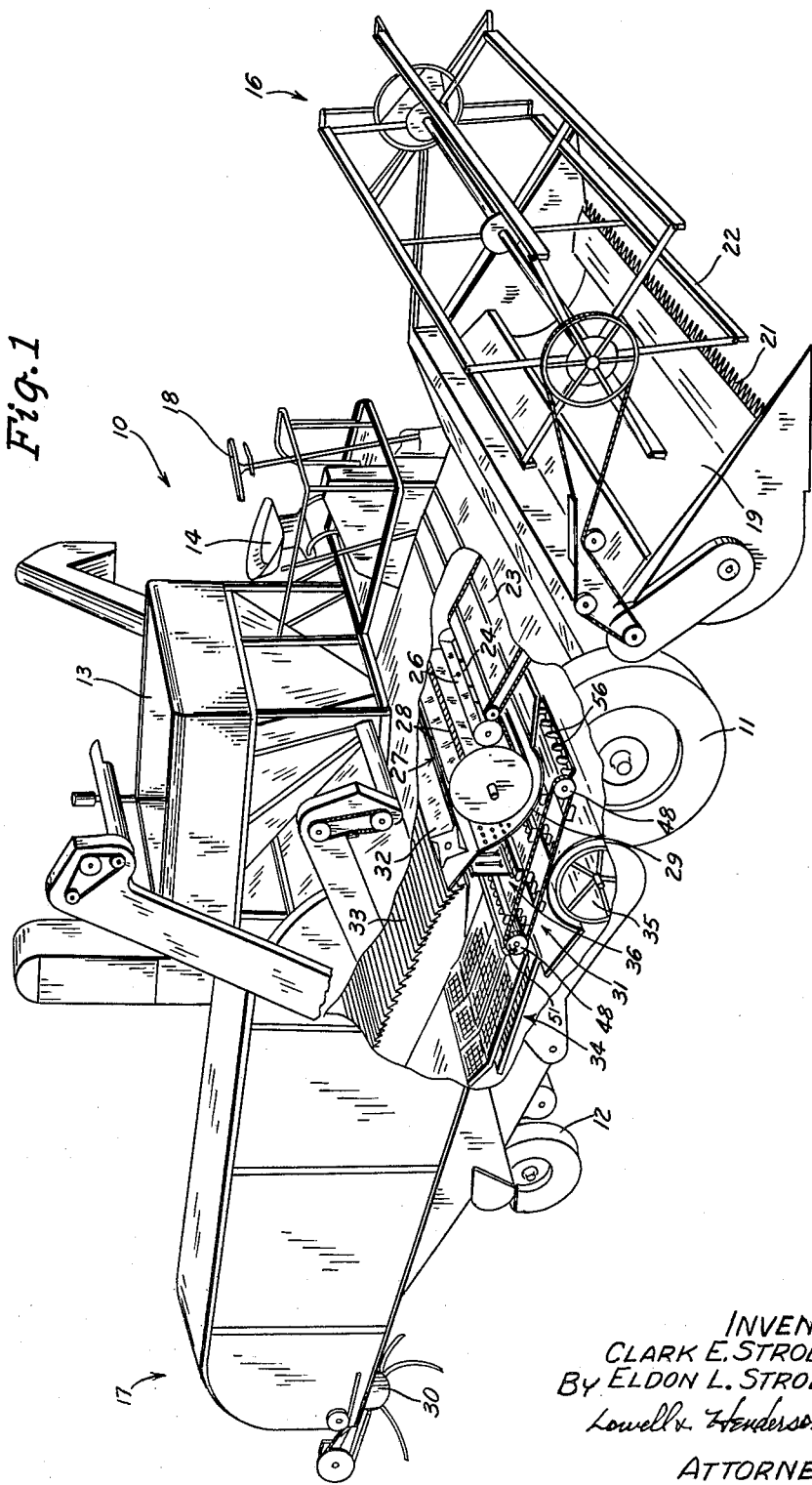

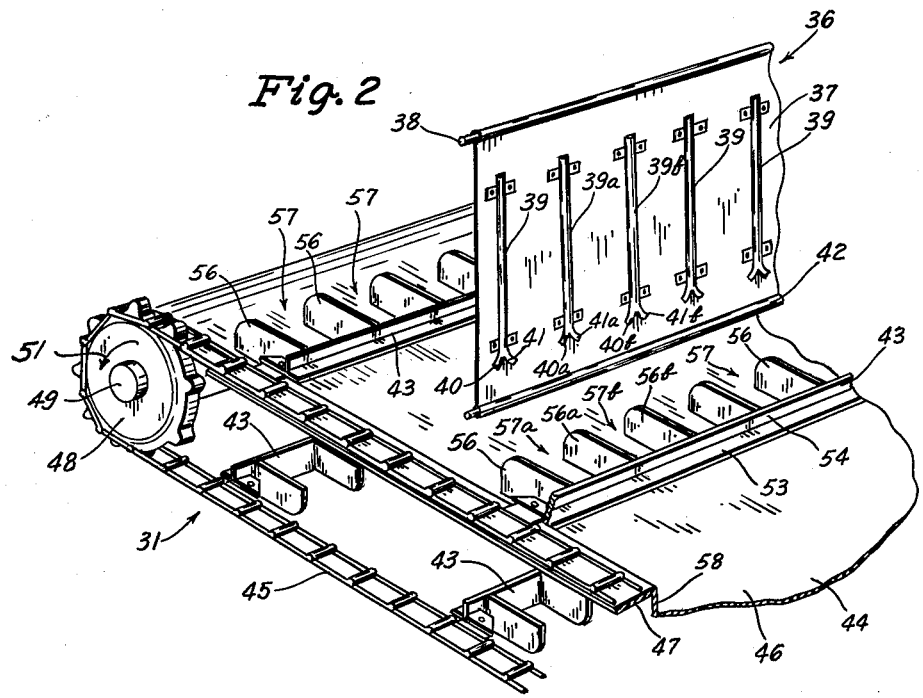

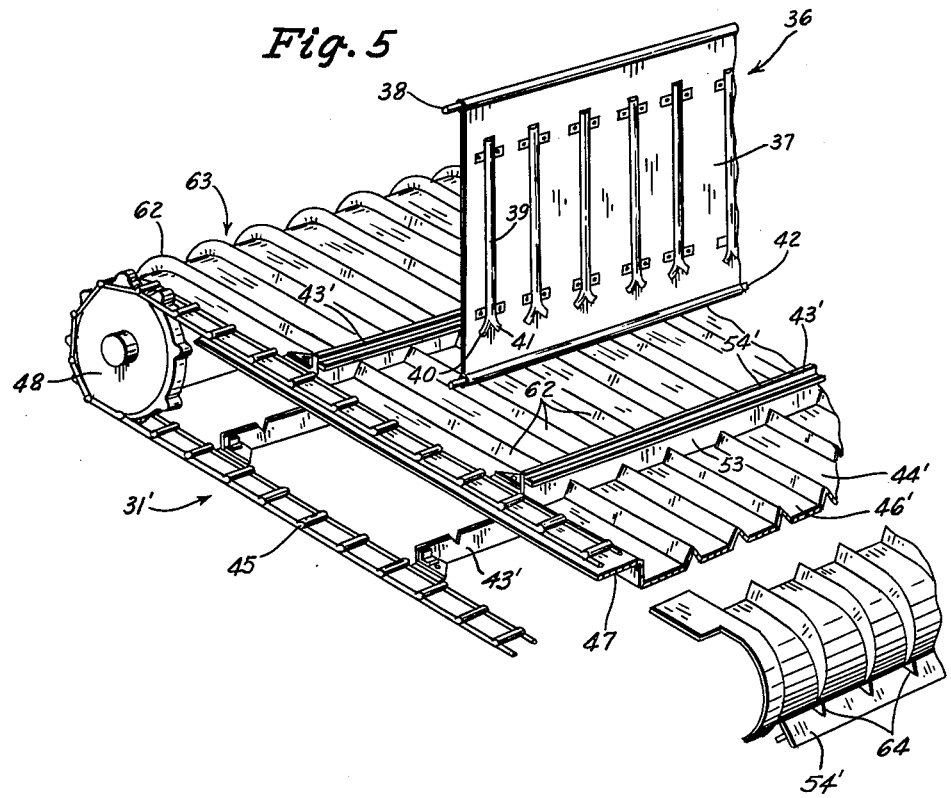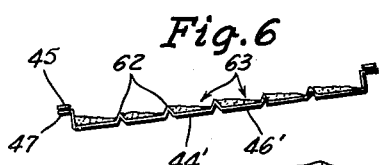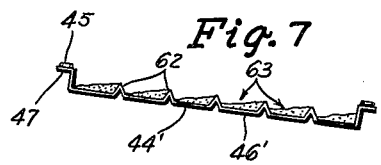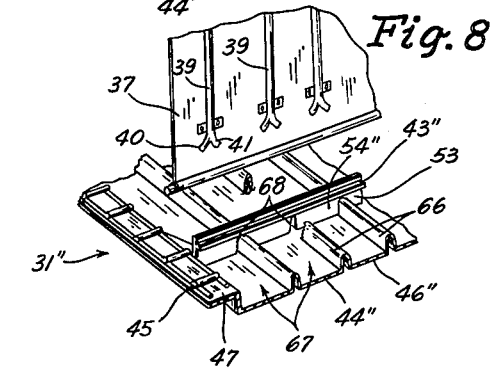

3,092,116
GRAIN DEFLECTOR AND LEVELER
FOR COMBINES
Clark E. Stroburg and Eldon L. Stroburg,
Blockton, Iowa
Filed Aug. 14, 1961, Ser. No. 131,129
4 Claims. (Cl. 130—27)

This invention relates to improvements to a combine or a combination harvester and thresher of the type which cuts the crop, threshes it and segregates the grain from the straw and like products in a continuous operation.

This type of equipment includes a threshing cylinder unit which discharges grain, together with chaff and other tailings, toward a grain pan unit while forcing the straw in a separate path toward straw walker units for spreading the straw onto the ground. The grain pan unit moves the grain and chaff onto a sieve-like chaffer unit where a final separation of the grain from the chaff is made. This final separation is accomplished by a cleaning fan which forces air through the chaffer unit to blow out the chaff and other lighter material.

It may readily be appreciated that the grain and chaff must be discharged evenly from the grain pan onto the chaffer unit across its entire transverse width in order to utilize the latter in the most efficient manner. This obviates the piling of the material on one side or another of the chaffer unit which may be due to an inclination of the combine while running on the side of a hill or on uneven terrain. Thus, should such side piling result, the forced air will not be too effective under the piled area, and conversely where thin layers of material are had the grain can be blown from the chaffer unit.

An object, therefore, of this invention is to provide an improved combine wherein irrespective of the slope or configuration of the terrain over which the combine travels, grain or like material is maintained in an evenly distributed manner transversely of its longitudinal path from the treshing cylinder unit toward and onto the chaffer unit.

Another object of this invention is to provide a deflector unit suspended relative to the threshing cylinder to deflect grain and chaff material evenly onto the grain pan unit.

Another object of this invention is to provide an improved grain pan unit for maintaining an even transverse distribution of grain or like material thereacross during movement to the chaffer unit so as to affect a like distribution onto the chaffer unit.

Yet another object of this invention is to provide a novel combination of a deflector unit and a grain pan unit for guiding and directing grain and like material onto the chaffer unit in an evenly distributed manner across the entire transverse width of the chaffer unit.

A further object of the invention is to provide a combination for accomplishing the above designated object which is economical to manufacture, easy to maintain, and effective in use.

These objects and other features and advantages of this invention will become readily understandable by reference to the following description and the accompanying drawing, wherein:

FIG. 1 is a perspective view of the combine of this invention, with certain parts broken away for clarity of illustration;

FIG. 2 is an enlarged, fragmentary perspective view of the deflector unit and the grain pan unit of this invention;

FIGS. 3 and 4 are reduced, fragmentary cross-sectional views of the grain pan unit of FIG. 2, showing the distribution of grain thereon when the combine is tilted to the left and to the right, respectively, from the horizontal;

FIG. 5 is a view similar to FIG. 2 and showing a modified form of the grain pan unit;

FIGS. 6 and 7 are views, similar to FIGS. 3 and 4, of the grain pan unit of FIG. 5; and FIG. 8 is an enlarged, fragmentary perspective view of another modification of the grain pan unit.

Referring to the drawings, the combine of this invention is illustrated generally at 10 in FIG. 1 and comprises a chassis (not shown) mounted on front and rear wheels 11 and 12, respectively. An engine 13 is mounted on the chassis for motivating the combine, and a seat 14 is provided for the operator, whereby a steering wheel 18 and other control mechanism (not shown) is readily available. As viewed in FIG. 1, the operator's seat 14 faces the front 16 of the combine in the normal direction of travel, the rear end indicated generally at 17.

The combine 10 is provided with a scoop-shovel type of platform 19 which extends forwardly in the direction of travel. The platform 19 includes a sickle or cutting bar 21 extending across the full width of the platform 19, a grain feeding reel 22, and a slatted conveyer 23 which extends upwardly and rearwardly of the reel 22.

The threshing mechanism of the combine includes a rotatable beater 24 provided with radially extended paddles 26 which rotate closely adjacent the upper end of the conveyer 23. Rotation of the beater is such as to move grain and straw from the conveyer 23 toward a threshing cylinder 27 which extends transversely of the combine 10 the full extent of the beater 24, and includes a plurality of circumferentially spaced rasp bars 28. The bars 28 co-act with a concave grate 29 fixedly mounted below the cylinder 27 to remove the grain from the straw and hull within which the grain is contained, to effect the threshing of the grain.

The grain that is threshed is deflected toward a grain pan unit 31 disposing below the concave 29; whereas straw, trash and unthreshed material is pulled from the upper edge of the concave 29 by a rotatable winged stripping beater 32. The beater 32 moves this material onto the front end of a plurality of rotary straw walkers or racks 33 which discharge the material at the rear end 17 of the combine, the discharge being aided by a straw spreading unit 30.

From the grain pan unit 31, the grain and chaff is moved onto a sieve-like cleaning unit 34, commonly called a chaffer, of the vibrating type. In combination with the vibration, air forced upwardly through the chaffer 34 from a blower fan 35 mounted below the chaffer blows the chaff from the grain and effects a final separation.

To insure that all the grain and chaff material, hereinafter referred to as "material," is deflected toward the grain pan unit 31 in an even manner across its tranverse width, a baffle or deflector unit 36 (FIGS. 1 and 2) is provided. The deflector unit 36 comprises a sheet of canvas or like material 37 which is suspended from a rod 38 so as to extend behind and across the entire width of the concave 29 above the unit 31. On the front side of the canvas sheet 37 are suitably secured a plurality of metal bars 39 spaced longitudinally of the canvas sheet 37 in parallel upright positions, and having their lower ends formed with diverged fingers 40 and 41 (FIG. 2). Another rod 42 is secured at the lower end of the canvas 37 in order to give vertical stability thereto, and is disposed in a contiguous relation with the transversely extended slats 43 of the grain pan unit 31.

In addition to the slats 43, the grain pan unit 31 comprises an apron or pan 44 extended transversely of the combine 10 the entire width of the concave 29, which pan 44 has a flat bottom 46 and flanges 47 (only one shown) at each side thereof which extend upwardly and outwardly from the bottom 46. At the front and rear ends of the pan 44, pairs of sprocket wheels 48 are suitably secured upon rotatable shafts 49 for rotation in the direction of the arrows 51 (FIGS. 1 and 2). A pair of continuous link-type chains 45 are mounted on the sprocket wheels 48 for movement on the flanges 47 to move the slats 43 rearwardly of the combine over the upper surface of the pan bottom 46, and forwardly thereunder.

Each slat 43 includes a cross bar 53 of a substantially T-shape in transverse section, with a cross arm portion 54 of the bar being normally upright and in a leading relation. Extended in a spaced relation longitudinally of the cross bar 53 are a series of flat plates 56 which project forwardly of the cross bar 53 in the direction of its movement, with the space 57 between each pair of adjacent plates 56 forming a pocket for receiving the material from the concave 29. Each plate 56 is vertically aligned with a corresponding bar 39, the purpose of which will be seen hereinafter. Furthermore, the bottom edge of each plate 56, along with the bottom edge of the cross bar 53, moves in a contiguous relation with the upper surface of the pan bottom 46.

In the operation of the threshing mechanism of the combine 10, it can readily be appreciated that without the canvas sheet 37 and the grain pan plates 56, were the combine to be operating on a slope the material being discharged from the concave 29 would be thrown toward one side or the other of the grain pan 44, and that material striking the center thereof would also slide to a side, thus causing a build up or piling of the material along a wall 58 (FIG. 2) of the pan 44.

Conversely, due to the provision of the canvas sheet 37 its bars 39, which act as guides, and the plates 56 on the slats 43, it can readily be seen that material striking, for example, the canvas sheet 37 between the bars 39a and 39b (FIG. 2) would fall, for example, to the left toward the bar 39a where it would be held to a fall normal to the surface of the pan 44. The grain would then be deflected by the finger 41a toward the space 57b between the arms 56a and 56b. It will be remembered that the arms 56a and 56b move in a path below the arms 39a and 39b. Therefore, as the slats 43 are moving across the pan 44 at a fairly high rate of speed, the material is quickly received and gathered within the space 57b before it has a chance to slide in a direction transversely of the pan 44.

Referring now to FIGS. 3 and 4, these illustrations depict how the material is maintained evenly within the spaces 57 between the plates 56, and transversely of the pan 44, even though the combine 10 and thus the pan 44 is tilted to the left (FIG. 3) or to the right (FIG. 4). As a result of this even distribution across the entire transverse width of the grain pan 44, the material discharged therefrom onto the chaffer 34 is also spread evenly across the entire width of the chaffer 34.

The import of this distribution on the grain unit 59 is as mentioned hereinbefore. Should the material be piled, for example, on one side of the chaffer 34, the effectiveness of the forced air from the fan 35 would be substantially reduced, and conversely the effectiveness could be too great were the grain and chaff to be in a thin layer on the chaffer 34 so that the grain itself could possibly be blown away with the chaff. Consequently, by discharging the material evenly across the entire transverse width of the chaffer 34, the forced air from the fan 35 is utilized in the most effective manner.

Referring to FIGS. 5–7, inclusive, wherein a modification of the grain pan unit 31' is illustrated, like reference numerals are used to indicate like parts. The bottom 46' of the pan 44' is deformed with a series of inverted, V-shaped parallel runners 62 extended longitudinally of the unit 31' and spaced transversely across the pan 44' so as to form a space 63 between each adjacent pair of runners 62. Each runner 62 is disposed beneath a corresponding bar 39.

To accommodate the runners 62, each slat 43' has a plurality of inverted V-shaped slots 64 formed in the lower edge of the cross arm 54'. Thus, as each slat 43' passes over the pan 44', the slots 64 mate with the runners 62. By this arrangement wherein the runners 62 act to prevent the material from sliding transversely on the pan 44', an even distribution of the material across the transverse width of the pan 44' is obtained for the same purpose and with the same results as mentioned hereinbefore relative to discharging the material onto the chaffer 34 (FIG. 2). As seen in FIGS. 6 and 7, irrespective of the tilt or inclination of the combine 10, and thus the pan 44', due to the provision of the runners 62 and the spaces 63 formed therebetween, the material from the threshing cylinder 27 and the deflector unit 37 is received and retained in an even distribution across the width of the grain pan 44'.

Referring to FIG. 8, a second modification of the grain pan unit 31" is disclosed, again with the like reference numerals used to indicate like parts. The bottom 46" of the pan 44" is formed with a series of up-standing ribs 66, extended parallel and longitudinally of the pan 44". The ribs 66 are spaced transversely across the pan 44" so as to form a series of spaces 67 between each adjacent pair of ribs 66.

Each slat 43" is formed with a series of transversely spaced slits 68 along the lower edge of the cross arm 54" to accommodate the ribs 66 as each rattle 43" passes over the surface of the pan 44". Here again, the result is the same as that obtained in the FIGS. 2–4 embodiment, and also in the FIGS. 5–7 embodiment. That is to say, with each rib 66 disposed below a bar 39 on the canvas sheet 37, the grain deflected from the sheet 37 falls into an area or space 67 disposed between a pair of adjacent ribs 66. Thus, by this arrangement, the material from the grain pan unit 31" is discharged evenly across the entire transverse width of the chaffer 34 (FIG. 2), providing the most efficient use of the forced air from the fan 35 in final separation of the grain from the chaff.

Although several embodiments of this invention have been disclosed herein, it is not to be so limited, as other variations and modifications can be made thereto within the full intended scope of the invention, as defined in the appended claims.

We claim:

1. A grain pan for a combine comprising a pan, sprocket wheels mounted at longitudinally opposed ends of the pan, conveyer means connected to said sprocket wheels for longitudinal movement over and under said pan, a plurality of slats secured to said conveyer means and extended transversely of said pan for movement in a contiguous relation to the upper surface of said pan, and a plurality of parallel arms secured to each slat and extended in the direction of movement of said slat, said arms being spaced longitudinally of each slat to form transverse pockets across said pan, each pocket having a substantially right angle U-shape, the lower surfaces of said arms being contiguous with said upper surface, whereby grain on said pan is received and retained in said pockets during movement of said slats over said pan.

2. In a combine, means for conveying grain and the like in a longitudinal path from the threshing cylinder to the chaffer comprising a deflector unit suspended relative to the cylinder to receive grain discharged therefrom, and a grain pan having an upper surface mounted for receiving grain from said cylinder and from said deflector unit, said deflector unit including a vertically disposed backing member and grain guides arranged on one side thereof facing said cylinder in transversely spaced positions, said grain conveying means including conveyer means movable over and under said pan and longitudinally thereof, slat means connected to said conveyer means and movable therewith, said slat means including a member extended transversely across said pan and movable over said upper surface, and a plurality of arms secured to said member in longitudinally spaced relation and movable therewith over said upper surface, each adjacent pair of arms forming a pocket with a portion of said member therebetween, said arms movable over said upper surface whereby to receive and retain grain and the like in said pocket for movement longitudinally of said pan.

3. In combination in a combine having a threshing cylinder and a chaffer unit, a deflector unit suspended relative to the cylinder to receive grain discharged therefrom, said deflector unit including a vertically disposed backing member and at least one upwardly extended grain guide secured to the side of the backing member facing said cylinder for limiting the transverse movement of the grain, means for moving grain in a longitudinal path from the threshing cylinder to the chaffer unit including a grain pan having an upper surface mounted below said deflector unit for receiving grain from said cylinder and said deflector unit and conveyer means movable over and under said pan and longitudinally thereof, said conveyor means engageable with the upper surface of said grain pan and forming therewith grain confining means for limiting the transverse shifting of the grain moving in the longitudinal path.

4. In a combine having a grain pan defining a substantially flat upper surface, and wherein said grain pan is tiltable transversely in response to travel of the combine over a transversely inclined ground surface, an endless conveyer means movable longitudinally over and under said pan, a plurality of slat means connected to said conveyer means and movable therewith, said slat means extended transversely across said pan and movable over said upper surface in a contiguous relation therewith, and a plurality of flat arms secured to each of said slat means in upright positions and extended in the direction of movement of said slat means, said arms being spaced longitudinally of each slat means to form with said slat means substantially right angle U-shaped pockets across said pan, the lower surfaces of said arms being contiguous with said upper surface, whereby grain on said pan is received and retained in said pockets during transverse tilting movement of said grain pan.

References Cited in the file of this patent

UNITED STATES PATENTS

| | | |
|---|---|---|
| 416,464 | Laufenburg | Dec. 3, 1889 |
| 555,782 | Lockwood | Mar. 3, 1896 |
| 629,758 | Abell | Aug. 1, 1899 |
| 668,041 | Flagg | Feb. 12, 1901 |
| 1,296,547 | Miller | Mar. 4, 1919 |
| 1,536,331 | Conant | May 5, 1925 |
| 1,680,888 | Kluck | Aug. 14, 1928 |
| 2,796,707 | Meter | June 25, 1957 |